United States Patent [19]
Schmidt et al.

[11] Patent Number: 5,423,054
[45] Date of Patent: Jun. 6, 1995

[54] PROCESSOR AND READ/WRITE HEAD INCORPORATED IN DISK FOR COMMUNICATING DATA TO HOST DIRECTLY FROM PROCESSOR READ/WRITE HEAD TO READ/WRITE HEAD OF HOST DISK DRIVE

[75] Inventors: Alfred C. Schmidt, Wilton; Robert Cordery, Danbury, both of Conn.

[73] Assignee: Pitney Bowes Inc., Stamford, Conn.

[21] Appl. No.: 185,106

[22] Filed: Jan. 21, 1994

Related U.S. Application Data

[63] Continuation of Ser. No. 88,495, Jul. 7, 1993, abandoned, which is a continuation of Ser. No. 458,865, Dec. 29, 1989, abandoned.

[51] Int. Cl.$^6$ .............. G06F 12/00; G06F 12/14; G06K 19/07; G06K 19/08
[52] U.S. Cl. .............. 395/800; 395/275; 360/133; 360/135; 360/137; 364/236.2; 364/248.1; 364/DIG. 1; 235/380; 235/492; 235/493
[58] Field of Search .............. 395/800, 275; 360/133, 360/135, 137; 235/380, 492, 493

[56] References Cited

U.S. PATENT DOCUMENTS

| | | | |
|---|---|---|---|
| 4,575,621 | 3/1986 | Dreifus | 235/380 |
| 4,742,215 | 5/1988 | Daughters et al. | 235/487 |
| 4,743,747 | 5/1988 | Fougere et al. | 235/494 |
| 4,760,534 | 7/1988 | Fougere et al. | 364/466 |
| 4,775,246 | 10/1988 | Edelmann et al. | 380/23 |
| 4,827,512 | 5/1989 | Hirokawa et al. | 380/23 |
| 4,831,244 | 5/1989 | Slafer et al. | 235/487 |
| 4,853,961 | 8/1989 | Pastor | 380/21 |
| 4,873,645 | 10/1989 | Hunter et al. | 364/479 |
| 4,878,246 | 10/1989 | Pastor et al. | 380/44 |
| 5,159,182 | 10/1992 | Eisele | 235/492 |

*Primary Examiner*—Thomas C. Lee
*Assistant Examiner*—Paul Harrity
*Attorney, Agent, or Firm*—Robert H. Whisker; Melvin J. Scolnick

[57] ABSTRACT

A computer-based system, such as a value printing system, has a host data processor having at least one disk drive that includes a first read/write head for reading data from and for writing data to a removable data recording disk. The system further includes a printer, coupled to the host data processor and responsive thereto, for printing indicia indicative of a monetary value. The system further includes a removable data recording disk having an integral data processor including a memory for storing data expressive of a monetary value associated with printed indicia. The integral data processor further includes a second read/write head coupled to the recording medium for communicating with the host data processor through the first read/write head.

9 Claims, 5 Drawing Sheets

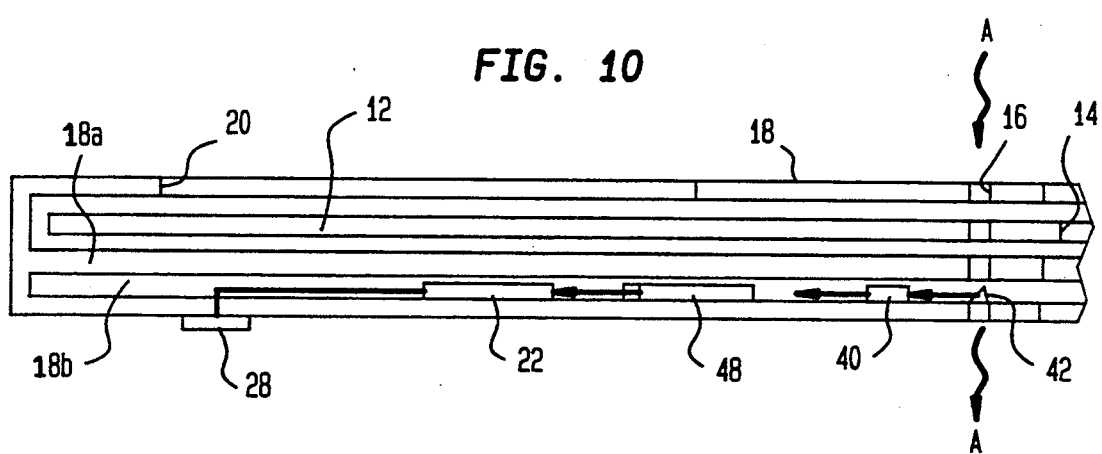
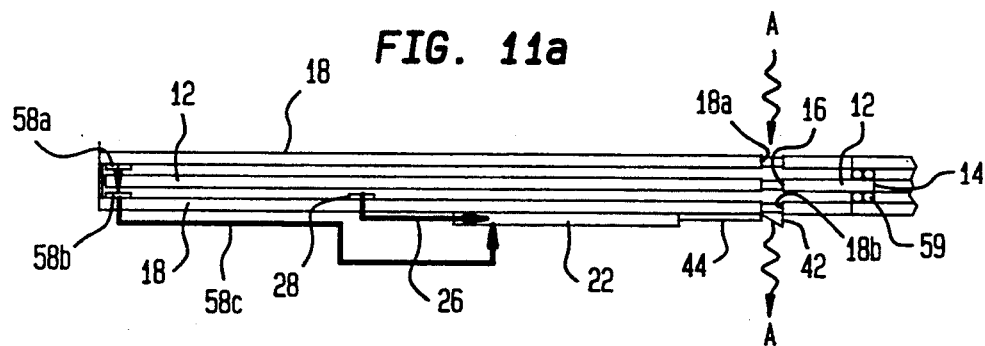
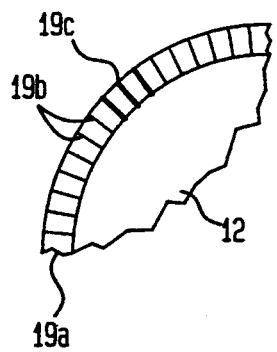
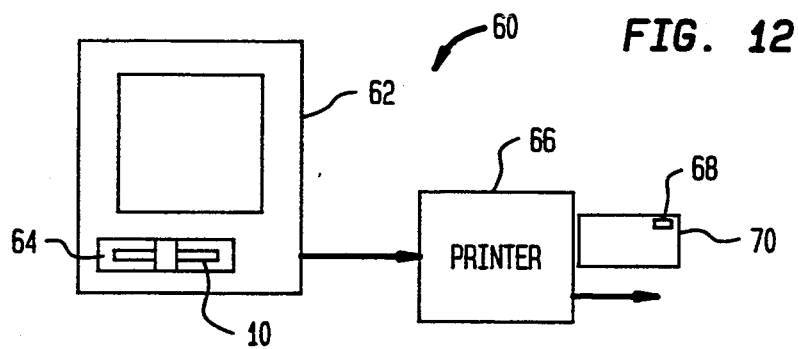

PROCESSOR AND READ/WRITE HEAD INCORPORATED IN DISK FOR COMMUNICATING DATA TO HOST DIRECTLY FROM PROCESSOR READ/WRITE HEAD TO READ/WRITE HEAD OF HOST DISK DRIVE

This application is a continuation of application Ser. No. 08/088,495, filed Jul. 7, 1993, now abandoned, which is a continuation of application Ser. No. 07/458,865, filed Dec. 29, 1989, now abandoned.

FIELD OF THE INVENTION

This invention relates generally to data processing method and apparatus and, in particular, to a data processing system forming an integral part of a removable magnetic recording media, such as a floppy disk. The data processing system communicates bidirectionally through a thin film read/write head to a read/write head of a recording media drive associated with a host system.

BACKGROUND OF THE INVENTION

A variety of techniques have been employed in an attempt to make floppy disks and other similar types of media difficult to copy. However, in most if not all known types of techniques corresponding methods have been devised to defeat the protection scheme, thus allowing an unauthorized duplication of the data contents of the disk.

Although a lack of a secure technique to prevent unauthorized copying of floppy disks is a serious problem to publishers of software this lack of secure technique presents an even greater problem for those who wish to implement a computer-based value printing system, such a postage meter. For example, a desirable type of postage meter would be software based and would be implemented on a personal computer. A postage meter software package would include an application program as well as a secure "vault" program for dispensing postage and for maintaining accounting information, including the ascending and descending postage registers. However, this desirable type of system has until now been impractical to implement in that a user of the system could employ known duplication techniques to replicate the postage vault software, thereby dispensing potentially limitless amounts of unauthorized postage.

Methods for preventing this type of fraud include requiring the postal authority to account for each metered letter that enters the mail stream, or requiring the meter user to install special vault hardware for providing the accounting function. However, neither of these approaches represents an optimal solution. For example, the former approach would place an undue data processing burden on the postal authority while the latter approach would increase both the cost and complexity of the resulting postage meter system.

It is thus an object of the invention to provide apparatus for implementing a secure data processing recording media such as a floppy disk.

It is another object of the invention to provide apparatus for implementing a secure data processing recording media that includes embedding a data processing unit within the media, the unit including a device for bidirectionally communicating with a host system through a read/write head of a conventional media drive.

It is one further object of the invention to provide apparatus for implementing a secure value printing system with a personal-type computer system that includes a data processing unit embedded within a removable-type of magnetic recording media, the unit including a device for bidirectionally communicating with a host system through a read/write head of a conventional media drive and further including a secure, non-volatile memory for maintaining at least the accounting data therein.

SUMMARY OF THE INVENTION

The foregoing problems are overcome and the objects of the invention are realized by a data storage unit adapted for being removably coupled to a disk drive, the unit including a data recording medium adapted for being coupled to a drive motor for being rotated thereby; an enclosure or envelope for containing the recording medium within; a data processor disposed upon or within the enclosure and a read/write head disposed within the enclosure substantially adjacent to a surface of the data recording medium. In one embodiment the read/write head is coupled to the data processor and reads and writes data signals directly to a read/write head of the disk drive. In another embodiment of the invention the read/write head is electrically coupled to the data processor for reading recorded data signals from the medium and recording data signals on the medium. The data storage unit may further include circuitry having an output coupled to the data processor for generating a reference signal expressive of a rotational position of the recording medium. In accordance with an embodiment of the invention the data storage unit includes non-volatile data storage means for storing data expressive of at least an equivalent of an ascending register and a descending register associated with a postage meter.

Further in accordance with the invention there is disclosed a value printing system that includes a host data processor having at least one disk drive that includes a first read/write head for reading data from and for writing data to a removable data recording disk. The system further includes a printer, coupled to the host data processor and responsive thereto, for printing indicia indicative of a monetary value. The system further includes a removable data recording disk having an integral data processor including a secure memory device for storing data expressive of a monetary value associated with printed indicia. The data processor further includes a second read/write head coupled to the recording medium for communicating with the host data processor through the first read/write head.

BRIEF DESCRIPTION OF THE DRAWING

The above set forth and other features of the invention are made more apparent in the ensuing Detailed Description of the Invention when read in conjunction with the attached Drawing, wherein:

FIG. 10 is a cross-sectional view of a disk constructed in accordance with a further embodiment of the invention, the disk having a rotating disk accessible from one side of the disk envelope and a thin film read/write head fixed on an opposite side of the envelope;

FIG. 11a is a cross-sectional view of a disk constructed in accordance with another embodiment of the invention, wherein a thin film read/write head is provided in a fixed relationship with the rotating media;

FIG. 11b shows an embodiment of the rotating media of FIG. 11a having a timing generating track disposed around a periphery of the rotating media; and FIG. 12 is a block diagram showing a value printing system, specifically a postage meter system that is one application of the invention.

DETAILED DESCRIPTION OF PREFERRED EMBODIMENTS OF THE INVENTION

The invention is described in the context of a magnetic recording medium having a form factor compatible with that of a conventional 5.25 inch removable floppy disk. However, it should be realized that the teaching of the invention is also applicable to removable disks of any diameter. Thus, although the invention is described below in the context of a 5.25 inch disk it should be realized that this form factor is exemplary and is not be construed as a limitation upon the practice of the invention.

Figure 1:
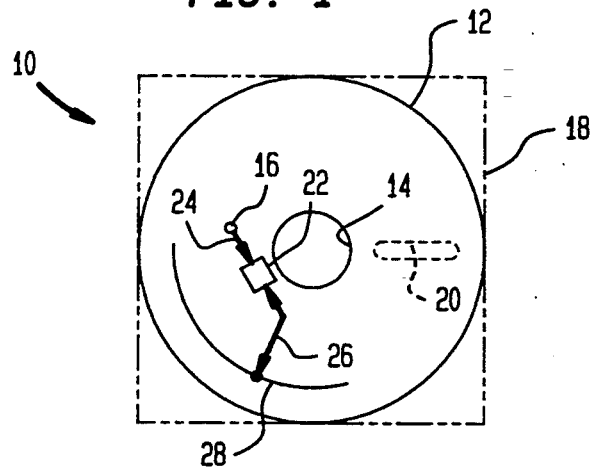
FIG. 1 is a top view, partially in block diagram form, of a magnetic media, specifically a 5.25 inch floppy disk, including an embedded data processing system and an integral device for communicating with a host system.

Referring first to FIG. 1 there is shown a disk 10 constructed and operated in accordance with one embodiment of the invention. Disk 10 includes a circular plastic diskette 12 coated with a conventional magnetic recording material. Diskette 12 has a centrally disposed spindle hole 14 and an index hole 16. An outer protective jacket 18, shown in dashed outline, surrounds and supports the diskette 12. Envelope 18 includes an opening 20 such that, when the disk 10 is inserted within a conventional disk drive and a door closing mechanism is engaged, one or more read/write (R/W) heads contact the diskette 12 upper and lower surfaces. The features as described above are conventional and are well known.

Further in accordance with the invention the disk 10 includes an integral data processing system 22. Data processing system 22 has a first connection 24 to the vicinity of the index hole 16 for sensing a rotation of the diskette 12, as will be described, and a second connection, specifically a head feed 26 coupled to a Thin Film Read/Write Head (TFRWH) 28. In this embodiment of the invention the data processing system 22 is positioned in the vicinity of the central spindle hole 14 and away from the active data storing portion of the diskette 12.

Figure 3:
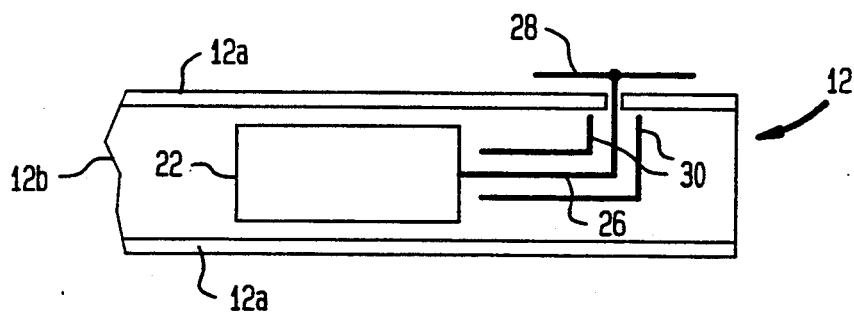
FIG. 3 illustrates in cross-section a portion of the disk of FIG. 1 showing the coupling of the data processing system to the integral read/write head.

As can be seen more clearly in the cross-sectional view of FIG. 3 the diskette 12 includes an upper and a lower magnetic oxide surface 12a overlying a substrate 12b. Embedded totally or partially within the substrate 12b is the data processing system 22 having the head feed 26 coupled to the TFRWH 28. The TFRWH 28 is disposed upon or within one or both of the surfaces 12a. Shielding 30 may be provided for electromagnetically shielding the TFRWH feed 26. If desired, the shield 30 may also enclose the data processing system 22 to reduce emitted Radio Frequency Interference (RFI).

Figure 2A:
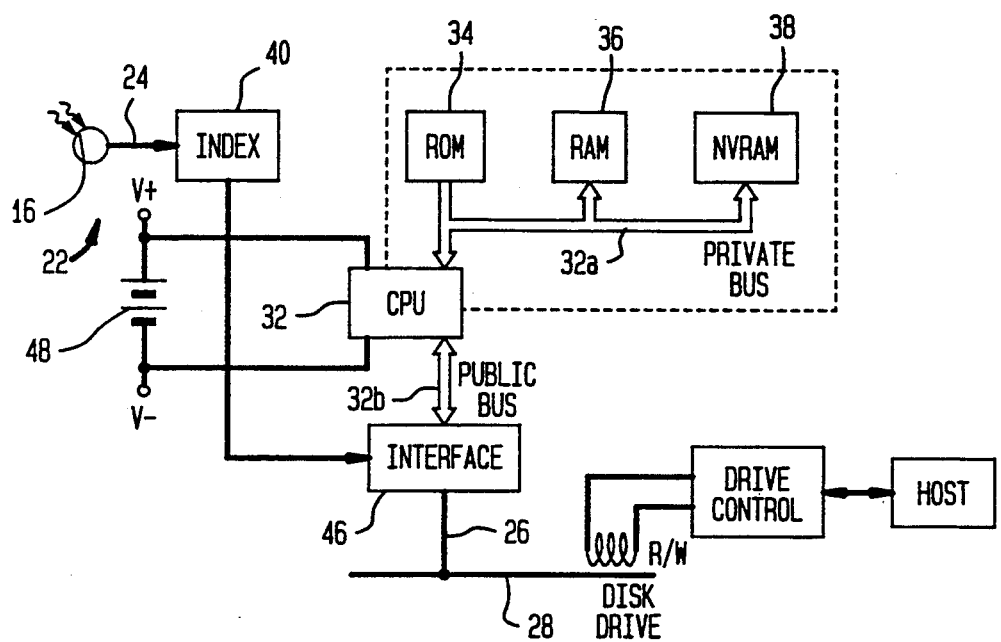
FIG. 2a is a block diagram illustrating the embedded data processing system and showing the coupling of the system to an index hole of the disk and to an integral read/write head.

Referring now to FIG. 2a there is shown in block diagram form and in greater detail the data processing system 22. System 22 includes a central processing unit (CPU) 32 coupled to secure circuitry indicated by the dashed outline. Specifically, CPU 32 is coupled via a Private Bus 32a to a read only memory (ROM) 34 wherein operating instructions and constants are stored, to a random access memory (RAM) 36 and, in accordance with one embodiment of the invention, to a non-volatile memory device such as a NVRAM 38. NVRAM 38 may be implemented as an EEROM device, a battery backed static RAM, ferroelectric RAM or by any suitable type of memory capable of maintaining stored data for an extended period of time. Separate CPU and memory components may be provided or a "single-chip" type of processor can be employed, the processor having integral memory and other types of devices such as I/O ports. Preferably any devices associated with the Private Bus 32a are encapsulated and secured by known technique against tampering.

An index mark coupling device 40 is optically coupled to the input 24 from the region of the index hole 16. Index coupling device 40 in this embodiment of the invention senses the proximity of the index hole 16 to a source of light provided within the disk drive. When the diskette 12 is rotating within the drive the index hole 16 periodically passes between the light source and a photodetector, thereby providing a pulse signal from the photodetector. The pulse signal is typically provided to a drive controlling device such that the device can determine a rotational reference signal therefrom.

Figure 5A:
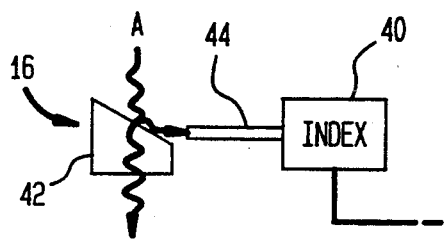
FIG. 5a illustrates one embodiment of a coupler for indicating when a disk index hole is positioned adjacent to a light source, the embodiment including a beamsplitter, formed integrally with the disk, and a fiber optic cable.

Referring to FIG. 5a there is shown one embodiment of the index coupling device 40 wherein the index hole 16 is fabricated to include an optical device such as a beam splitter 42 whereby a portion of the light, indicated by the arrow (A), is directed to an input end of a fiber optic 44. The fiber optic 44 conveys the light an input of the index coupling device 40. In this embodiment the index coupling device 40 includes a photodetector for detecting that portion of the light directed through the fiber optic to generate a pulse signal that is coupled to the CPU 32.

Returning to FIG. 2a data processing system 22 further includes, in accordance with the invention, a TFRWH interface 46 bidirectionally coupled to the CPU 32 via the Public Bus 32b. The TFRWH interface 46 is coupled to the TFRWH 28 through the head feed 26.

The TFRWH 28 can take several different forms. By example, J. P. Lazzari et al. describe in a journal article entitled "A New Thin Film Head Generation IC Head" IEEE Transactions on Magnetics, Vol 25, No 5, September 1989, pp. 3190–3193 a silicon based thin film head for high density magnetic recording. The complete device, including head, rails and ABS ramp is obtained on a 600 micron thickness silicon wafer using microelectronic techniques.

Figure 8A:
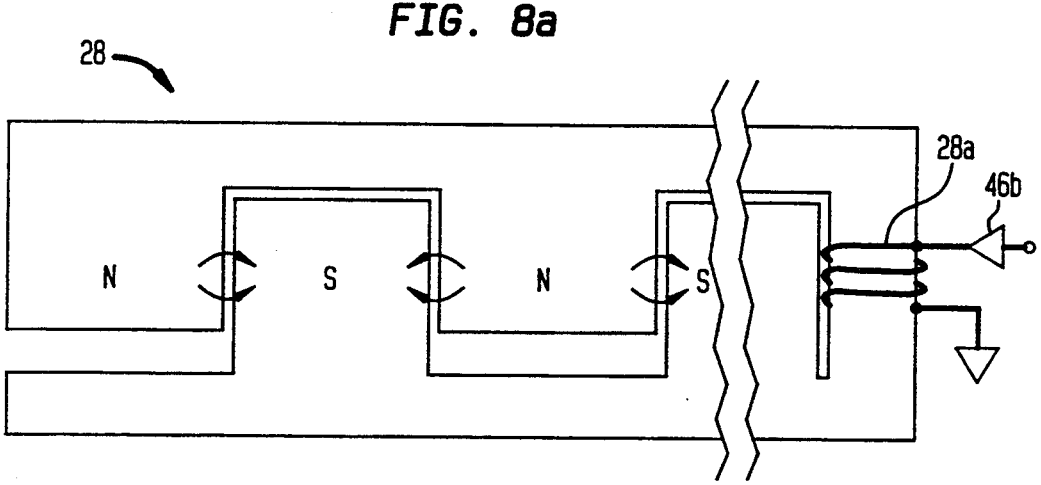
FIG. 8a is a top, enlarged view illustrating an embodiment of a thin film read/write head disposed on or within a surface of a disk.

As shown in FIG. 8a a first embodiment of the TFRWH 28 is comprised of a layer of electrically conductive material deposited in a predetermined shape for forming a plurality of magnetic North (N) and South (S) poles. A driver 46b, described in greater detail below, is coupled to a coil 28a for driving the TFRWH 28. As seen more clearly in FIG. 8b magnetic lines of flux (LF) are set up between adjacent N and S poles of the TFRWH 28. These lines of flux are detected by the read/write head of the drive as the drive head passes over such a region. Due to spacing requirements and the geometry of the TFRWH 28 the flux lines may be provided at a minimum spacing corresponding to every nth bit cell. As a result, it may be desirable for some applications to prerecord bit cells on the medium in the regions adjacent to the bit cells induced by the TFRWH 28. In this regard the TFRWH 28 may be embedded beneath the surface of the diskette 12 or may be provided on the surface of the diskette 12.

Figure 8B:
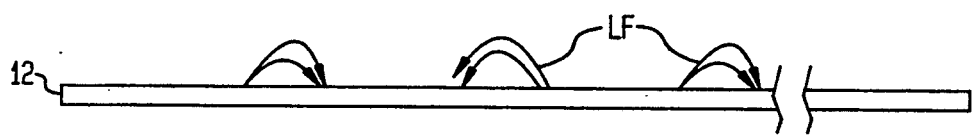
FIG. 8b is a side view of the disk of FIG. 8a showing the magnetic lines of flux forming bit cells readable by an external drive read/write head.
Figure 8C:
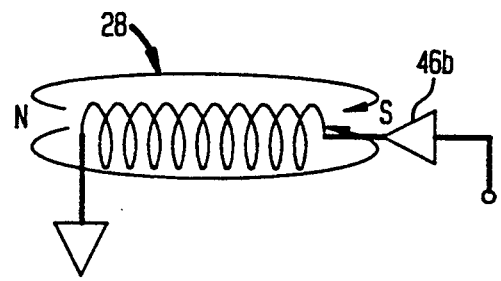
FIG. 8c illustrates a thin film read/write head constructed as an extended coil shaped device.

FIG. 8c illustrates a further embodiment of a TFRWH 28 constructed as an extended coil shaped device. In this embodiment of the invention the TFRWH 28 functions in a manner analogous to an antenna for generating an electromagnetic field and for receiving same. This embodiment typically requires more power in order to provide a required flux density at a central region of structure and, due to the significant inductive reactance of the structure, may require pulse shaping in conjunction with driver 46b.

Figure 9:
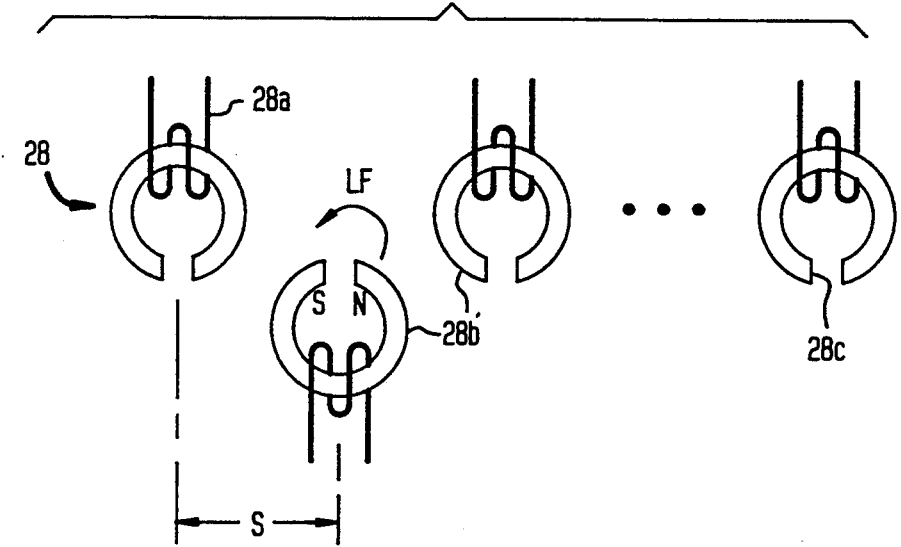
FIG. 9 is a top, enlarged view illustrating an embodiment comprised of a plurality of individual thin film read/write heads of toroidal shape.

Referring to FIG. 9 there is shown a still further embodiment of the invention wherein the TFRWH 28 is comprised of a plurality of discrete thin film toroidal devices 28b each of which includes a coil 28a that is driven separately or in tandem with the coils of others of the devices 28b. Each of the devices 28b is linearly positioned along a track of the diskette at a spacing (S) corresponding to nth bit cell positions for generating magnetic lines of flux across gap 28c associated with each of the devices 28b.

In order to appear as one bit cell for a chosen media size the TFRWH 28 is preferably fabricated by photolithographic masking and thin-film deposition techniques to deposit a layer or layers of material upon a substrate. A magnetic material such as Permalloy is deposited in a desired shape, such as the toroidal shape of the devices of FIG. 9. Alternatively, a deposited layer can be etched back by conventional technique to create the interdigitated structure of FIG. 8a. Combinations of deposition and etchback techniques can also be used to achieve a desired geometry. The coils 28a are similarly formed.

By example, in regard to FIG. 9 a layer of conductive material such as gold is deposited to define a lower portion of each of the coil 28a structures. Next a layer comprised of an electrical insulator is deposited followed by the material, such as Permalloy, of the device 28b. Another layer of insulator is deposited and then a top portion of the coil 28a. Openings are made through the insulator layers and are filled with electrical conductor for forming a plurality of vertically disposed conductive vias for coupling the lower portion of the turns of the coil to the upper portion.

In the embodiments of FIGS. 8a, 8b and 9 the data processing system 22 drives the associated bit cells to a predetermined state that is detectable by the drive read/write head. For example, if a track is prerecorded with data, including CRC information, for a given sector setting one or more of the bit cells within the data field generates a CRC error that is detectable by the host system. The host system is thus notified that the data processing system 22 is initiating a transmission of data.

Inasmuch as the TFRWH 28 is driven by the data processing system 22 relative motion between the drive read/write head and the diskette 12 is not required in order that the drive read/write head cut lines of flux. That is, the drive read/write head and the diskette 12 can be maintained stationary relative to each other while the drive read/write head detects the magnetic lines of flux generated by the TFRWH 28. Similarly, magnetic lines of flux generated by the drive read/write head during a write operation are detectable by the TFRWH 28.

Figure 2B:
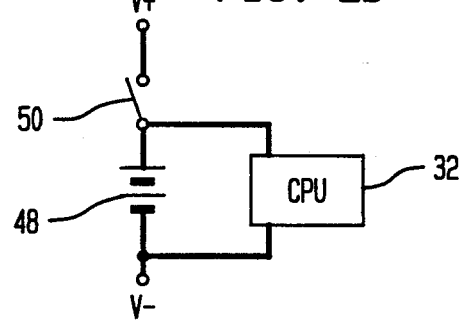
FIG. 2b illustrates in block diagram form a portion of the embedded data processing system, specifically a switch coupled to a battery for providing power only when the disk is in use.
Figure 2C:
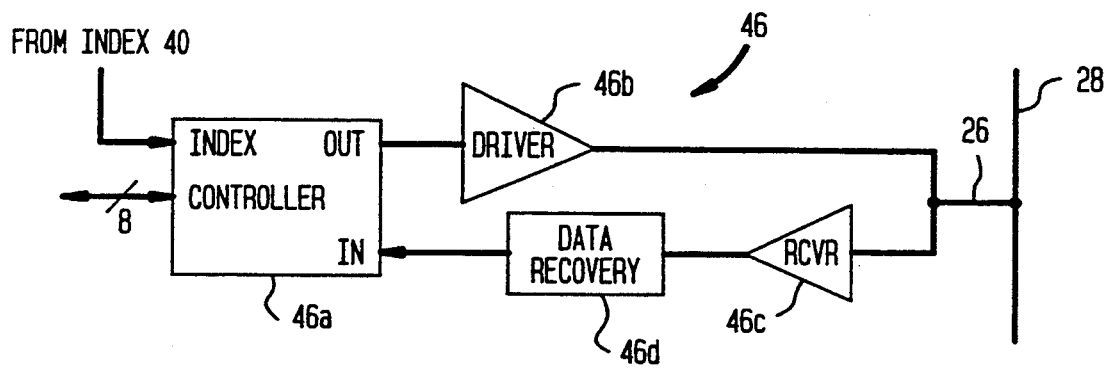
FIG. 2c is a block diagram illustrating in greater detail circuitry included within an integral thin film read/write head interface.

As can be seen in greater detail in the block diagram of FIG. 2c the TFRWH interface 46 includes circuitry for formatting and serializing data driven to the TFRWH 28 and for receiving, formatting and accumulating a serial data stream received from the TFRWH 28. This circuitry is comprised, in a preferred embodiment of the invention, of a disk controller integrated circuit 46a which may be identical to the disk controller device within the host system. The disk controller 46a has an interface with the CPU 32 and also receives an input from the Index block 40. Controller 46a has an output coupled to a driver 46b for driving the TFRWH 28 when writing data to the host system. Depending on the construction of the TFRWH 28 the driver 46b may include pulse shaping circuitry for compensating for signal distortion induced when the TFRWH 28 has a significant inductive component associated therewith. Controller 46a also has a receiver 46c coupled to the TFRWH 28 and a data recovery circuit 46d, such as an analog or a digital phase locked loop, for inputting serial data from the TFRWH 28 to the controller 46a. In some conventional disk controllers the data recovery function is integrated within the controller. The controller 46a may be a component physically separated from the CPU 32 or may be fabricated as a standard cell with a CPU core and memory devices as a high density custom or semi-custom integrated circuit. The controller 46a preferably operates in accordance with conventional industry standard track format information as illustrated in Tables 1, 2 and 3, wherein Table 1 illustrates a conventional track format for a disk recorded with single density (FM) data; Table 2 illustrates a conventional track format for a disk recorded with double density (MFM) data; and Table 3 is a chart showing various gap and other values as a function of sector size, recording density and disk diameter.

It is pointed out that the construction and packaging of the data processing system 22 is similar in some respects to that associated with "smart card" technology wherein data processing circuitry and memory are disposed within thin, credit card-sized modules. By example, commonly assigned U.S. Pat. No. 4,743,747, May 10, 1988, Fougere et al., U.S. Pat. No. 4,760,534, Jul. 26, 1988, Fougere et al. and U.S. Pat. No. 4,775,246, Oct. 4, 1988, Edelmann et al. disclose cards or portable modules constructed to include data processing means and secure memory for postage and/or other value printing systems. Furthermore, commonly assigned U.S. Pat. Nos. 4,878,246, 4,873,645 and 4,853,961, Jose Pastor, describe encryption and decryption method and apparatus useable with such systems for securing the systems against a fraudulent dispensing of postage or other items of value. As such, the disclosure of these commonly assigned U.S. Patents is incorporated herein in its entirety.

Data is transferred over the Public Bus 32b between the CPU 32 and the host system when the disk 10 is contained within a conventional disk drive and the TFRWH 28 is in contact with one or more read/write (R/W) heads of the drive. The TFRWH interface 46 further includes circuitry for receiving from the TFRWH 28 electromagnetic information that is written by the R/W head of the disk drive. In this regard it should be noted that in this embodiment of the invention the disk 10 is fully electrically and mechanically compatible with conventional disk drives and with the associated drive controller. In other words, the drive and controller are unaware that data being read from the disk 10 is being transmitted from the TFRWH 28. Likewise, these components are unaware that data being written to the disk is being received by the TFRWH 28. That is, the disk drive reads and writes the TFRWH 28 of the disk 10 as it normally would a surface of a conventional disk.

FIG. 2a further illustrates a system 22 power source or battery 48. The battery 48 is preferably a Lithium or similar long-life battery that provides operating voltages indicated as the potentials V+ and V−. The data processing system 22 is preferably comprised of CMOS and/or other low power consumption circuitry to maximize the useful life of the battery 48.

In this regard FIG. 2b illustrates an embodiment of the invention wherein the battery 48 is coupled to the data processing system 22 through a switch 50. The switch 50 in a preferred embodiment is a centrifugal-type switch that closes and powers the data processing system 22 only when the diskette 12 is rotating within the disk drive. This technique is especially advantageous in that many host systems deactivate the drive motor during periods of no disk activity in order to reduce drive power consumption and prolong the life of the drive motor. In another embodiment the switch 50 is disposed adjacent to the central spindle hole 14 such that when the disk 10 is inserted within the drive and the drive door is closed the drive spindle engages the diskette 12 and also closes switch 50. Both of these embodiments of the invention advantageously provide for an extension of battery 48 life in that battery power is only provided when the disk 10 is considered to be in use, that is, when the disk 10 is installed within a disk drive.

Figure 4:
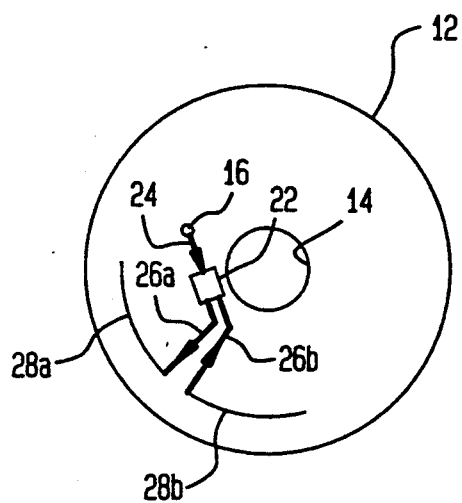
FIG. 4 illustrates another embodiment of the invention wherein a read head and a separate write head are provided at a single track position of the disk.

Referring to FIG. 4 there is shown another embodiment of the invention having a diskette 12 constructed as previously described in relation to FIG. 1. The embodiment of FIG. 4 differs from that of FIG. 1 in that the data processing system is coupled to two separate Thin Film Heads (TFHs), specifically, a read TFH 28a and a write TFH 28b. Each of these TFHs is coupled via a separate head feed 26a and 26b, respectively, to the TFRWH interface 46 (not shown in FIG. 4). In the embodiment shown in FIG. 4 the TFHs 28a and 28b are each disposed upon a same side and at a single track position of the diskette 12, that is, at a same radius from the center of the diskette 12. It should be realized that the TFHs 28a and 28b could be disposed upon opposite sides of the diskette 12 and need not occupy the same track position. What is important in this embodiment of the invention is that the TFHs be disposed upon or within the diskette 12 surface such that they are physically and electrically accessible by the drive R/W heads.

Figure 6:
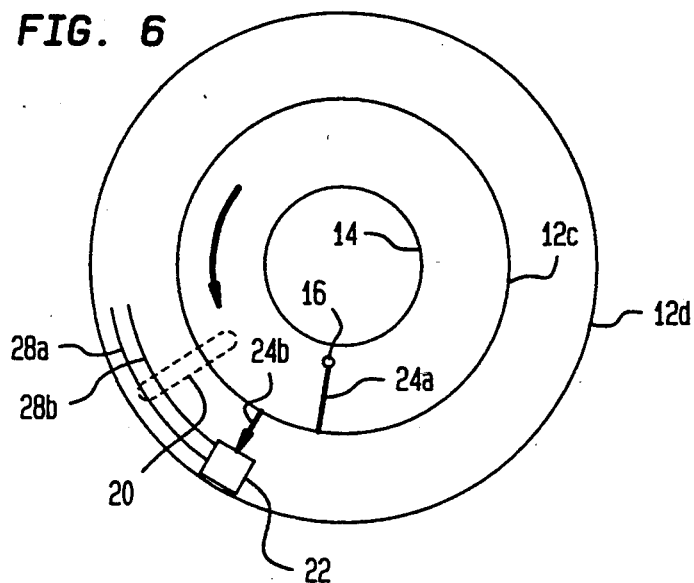
FIG. 6 illustrates a further embodiment of the invention wherein an inner portion of the disk rotates while an outer portion containing the embedded data processing system is stationary, the Figure further illustrating an embodiment of the integral read/write head wherein separate read and write heads are positioned on two different tracks of the disk.

Referring now to FIG. 6 there is shown a further embodiment of the invention wherein the diskette 12 includes a central portion 12c that is free to rotate within the drive and an outer portion 12d that is fixed in place within the envelope 18 (not shown). Although the outer portion 12d is shown to have a round shape it may be rectangular or square and conform to the shape of the envelope 18. In this embodiment the data processing system 22 is disposed at a periphery of the diskette 12 in the non-rotating portion 12d. The fixed outer portion 12d is disposed relative to the opening 20 such that the TFRWH or TFRWHs are positioned beneath the region traversed by the drive R/W head. This embodiment has the advantage that the inner portion 12c can be written upon and read by the host system in a manner substantially identical to a normal floppy diskette. That is, by positioning the R/W heads to the inner tracks (high track numbers) of the diskette a normal floppy disk read/write activity can occur whereas by positioning the R/W heads to the outer track area (low track numbers) of the diskette the R/W heads are positionable over the TFRWH(s) 28.

In this embodiment a first part of the fiber optic 24a is brought to an outer edge of the inner rotating diskette 12c. A corresponding second portion 24b is disposed on the fixed outer portion 12d of the diskette 12 and has an end brought to the inner edge. The ends of the first and the second portions of the fiber optic 24 are disposed such that they come into optical alignment once per inner diskette 12c revolution and at a time when the index hole 16 is passing beneath the light source within the drive. As a result a portion of the light from the light source is transmitted from the portion 24a across the intervening gap to the portion 24b where it is detected. In this embodiment it is important that the portions of the fiber optic 24 be positioned such that when the index hole 16 passes beneath the light source within the disk drive that the two opposing ends are optically aligned for coupling the light therebetween. Miniature lens elements integral with or separate from the ends of the fiber portions may be provided for enhancing the coupling of light between portions of the fiber optic conductor.

Figure 7:
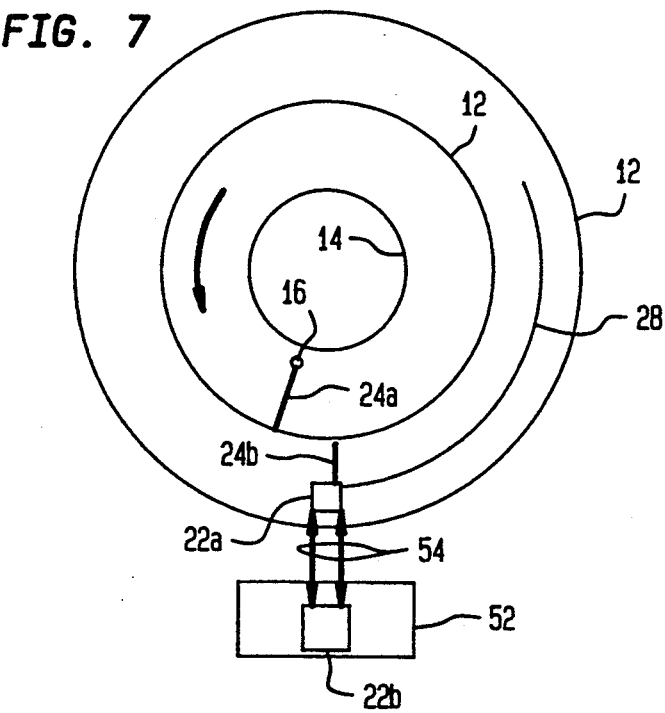
FIG. 7 illustrates a still further embodiment of the invention wherein an inner portion of the disk rotates while an outer portion remains stationary and wherein at least a portion of the embedded data processing system is disposed off of the disk.

The embodiment of FIG. 7 is similar to that of FIG. 6 with the exception that the data processing system 22 is partitioned such that a first portion 22a of the data processing system 22 is disposed on the fixed portion 12d of the diskette while a second portion 22b is disposed external to the diskette 12, typically within a protective module 52. An electrical cable 54 interconnects the portions 22a and 22b. In this regard flexible circuit technology can be employed to form the diskette outer portion 12d, the cable 54 and to also function as a substrate for mounting and interconnecting the various elements of the data processing system 22. In operation, the diskette portions 12c and 12d are inserted within the drive while the cable 54 extends through the drive door or opening, leaving module 52 external to the drive. The embodiment of FIG. 7 is especially advantageous when it is desired to increase the size of the battery 48 or some other component of the data processing system and the resulting form factor no longer is compatible with that of a conventional disk envelope and/or drive. This embodiment furthermore facilitates the inclusion of a rechargeable type of battery, such as a nickel cadmium battery, in that a charger or charger connection can be included within the module 52.

It should be realized that those embodiments of the invention wherein a portion of the diskette is fixed and does not rotate can be extended to include the entire diskette if it is not desired that a portion of the diskette function as conventional rotating disk. By example, in FIG. 1 the entire diskette 12 could be fixed in place within the envelope 18. That is, the spindle hole 14 could be made with a larger diameter that does not engage the rotating spindle when the diskette 12 is inserted within the drive. In order to provide an index pulse to the drive controller the embodiment of FIG. 5b may be employed whereby the index coupler 40, instead of receiving light from the index hole 16, drives a light emitting device such as an LED 56. The LED 56 is disposed upon the diskette 12 or envelope 18 such that when the diskette 12 is inserted within the drive the LED 56 is positioned over or closely adjacent to the index hole photodetector within the drive. By periodically pulsing the LED 56 the drive controller is caused to sense a synthetic index pulse and operate as though the diskette 12 were rotating. For example, a conventional 5.25 inch floppy disk rotates at a nominal speed of 300 RPM. Thus, by pulsing the LED 56 every 200 milliseconds an apparent disk rotation is simulated.

This latter concept is further developed in the embodiment of FIG. 10 wherein there is shown a cut-away view of a portion of the disk 10 wherein the diskette 12 is disposed within an upper portion of the envelope 18 and freely rotates therein. In this embodiment of the invention the envelope 18 has a partition 18a forming a lower compartment 18b within which the data processing system 22, battery 48 and other circuitry is disposed. In accordance with this embodiment the upper read/write head of the drive is in contact with the diskette 12 through the upper opening 20. In this manner the drive is enabled to read and write the upper surface of the rotating diskette 12 in a conventional manner. Fixed to or extending through a bottom surface of the envelope 18 at a position corresponding to a preselected track position is a fixed TFRWH 28. By positioning the drive lower read/write head over the TFRWH 28 the data processing system 22 is enabled to communicate with the host system. In this embodiment of the invention the TFRWH 28 may be provided at some angular offset to the drive read/write head to reduce track misalignment effects. For example, an offset of approximately 10 degrees between the two heads reduces alignment error while still providing for adequate flux linkage between the two heads. To facilitate synchronization of the data processing system 22 to the host system the index hole 16 passes through the envelope 18 including the partition 18a and a portion of the light from the index source within the drive is coupled to the data processing system 22 by means of the beam splitter 42 or other conventional light diverting means.

Figure 5B:
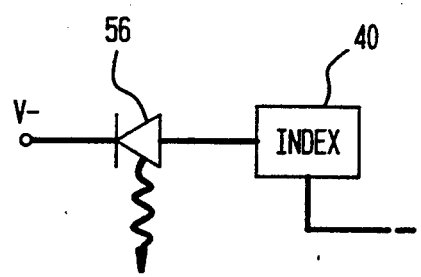
FIG. 5b illustrates another embodiment of a coupler for simulating a rotation of a disk by periodically pulsing a light source optically coupled to a drive index hole photodetector.

In any of the embodiments of FIG. 5a, FIG. 5b and FIG. 10 the CPU 32 and/or controller 46a is apprised of the apparent location of the index hole and is enabled to synchronize track write and read operations with the external controller. It is noted however that the teaching of the invention is also applicable to soft-sectored, as opposed to hard sectored, recording media. This aspect of the invention is described in detail below.

The CPU 32, or the disk controller 46a, when transmitting data to the TFRWH 28 serially transmits bits in accordance with the formats illustrated in Tables 1, 2 and 3 or in accordance with some other format recognized by the host system disk controller. Also, when the external controller is to write data to the data processing system 22 the system 22 must first transmit the initial portion of the track and sector information to the external controller such that the controller can identify the desired track and sector.

Referring now to FIG. 11a there is shown a further embodiment of the invention. In the embodiment of FIG. 11a the central processing unit 22 is disposed upon an outer surface of the disk envelope 18 while the TFRWH 28 is disposed upon an inner surface of the envelope 18 for reading and writing the diskette 12 disposed within. FIG. 11a also illustrates the use of a rotational coupler 59 that includes bearings for coupling the diskette 12 to the drive spindle. The use of the coupler 59 substantially reduces any tendency for misalignment between the diskette 12 and the fixed position of the TFRWH 28. Preferably the central processing unit 22 is disposed upon a same surface of the envelope as an exit hole 18b for the index light (A). An opposing entrance hole 18a is provided for admitting the light to the disk index hole 16. The coupler 42 of FIG. 5a is provided for diverting a portion of the light to the fiber optic 44 and to the index detection block 40 of system 22. This embodiment has the advantage of allowing the entire diskette 12 to be used for the storage of data and furthermore does not require any modification to be made to the diskette 12. All circuitry is contained upon or within the envelope 18, the circuitry being coupled to the diskette 12 through the TFRWH 28. It should be noted that if desired the partitioned envelope of FIG. 10 can be employed to contain the data processing system 22 and other devices.

In this embodiment the host drive writes data to a predetermined track of the diskette 12. This data is subsequently read through the TFRWH 28 which is positioned in alignment with the predetermined track. When writing to the host the predetermined track is written by the CPU 32 through the TFRWH 28 and the host system subsequently reads the data in a conventional manner. By example, in a double density (MFM)

mode of operation with eight, 512 byte sectors per track the CPU 32 is enabled to transfer up to 4,096 bytes of data to or from the host system by a single track read or write operation. In this embodiment the TFRWH 28 may have a size and shape similar to that of the R/W heads found in conventional disk drives. Alternatively, the TFRWH 28 can be constructed to both write and read a larger area of the diskette 12 surface, such as an area equivalent to the the track spacing associated with a plurality of tracks. The wider TFRWH beneficially serves to reduce misalignment error between the diskette 12 and the fixed head such that the coupler 59 may not be required. More than one TFRWH 28 can be provided so long as the TFRWH Interface 46 includes circuity for selectively coupling to one of the TFRWHs at a time.

In various ones of the embodiments of the invention synchronization of the data processing system 22 to the drive may be facilitated by the inclusion of a timing track 19a provided on a periphery of the diskette 12. As seen in FIG. 11b the timing track 19a is formed as a plurality of optically opaque regions or lines 19b formed upon a substantially transparent outer edge of the diskette 12. As seen in FIG. 11a the disk 10 includes a source 58a of light and a corresponding receiver 58b positioned opposite the source 58a such that the timing track 19a rotates therebetween. A connector 58c couples the output of the receiver 58b to the system 22. The timing marks 19b are preferably positioned for sectoring the media. This approach is especially advantageous for those types of disks that do not employ a hard sectoring reference mark such as the index hole 16 and also for those embodiments where the system 22 rotates with the diskette 12. The timing track 19a can include a distinguishable mark such as that depicted at 19c for indicating a reference position, in a manner similar to that of a conventional index hole. The use of the timing track 19a also advantageously reduces susceptibility to disk rotational speed variations.

In all of the disclosed embodiments of the invention the CPU 32 communicates to the external host system through the TFRWH 28. Access to the CPU 32, and through the CPU 32 to the Private Bus 32a for the purpose of adding to funds, such as recharging the accounting registers with additional funds, is made secure through encryption procedures such as those disclosed in the U.S. Patents previously incorporated by reference. Other communications with the CPU 32 may be those made "in the clear" that is unencrypted communications By example, a request that funds be expended can be made in an unencrypted fashion. The contents of an accounting register can also be read out in an unencrypted fashion. Additionally some information sent to the CPU 32 for inclusion as part of the encrypted string, such as a date or address associated with a mailpiece, can be transmitted in an unencrypted form. Data sourced by the CPU 32 and transferred to the Host system can be encrypted, unencrypted or a combination of both.

As an example of an application of the invention further discussion is made relative to a value printing system, specifically a postage meter system shown in FIG. 12. A postage meter 60 includes the disk 10 of the invention, a Personal Computer-type (PC) data processing system 62, including at least one disk drive 64, and an unsecured printer 66. The meter's secure accounting registers or equivalents thereof are implemented in the memory of the data processing system 22, specifically within the NVRAM 38. Printer 66 prints proof of payment, such as a postage indicia 68, on envelopes 70 under the control of a postage meter application program running on the CPU 32. Proof of payment printed on the envelope may include, in a known manner, an encrypted string that originates from the CPU 32. An encryption key and algorithm is included within the ROM 34 of the data processing system 22. As such, it is impossible for a user of the postage meter 60 to provide a valid proof of payment on an envelope in that the user does not have access to the encryption algorithm. As can be realized, if the disk 10 were removed from the data processing system 62 the system 62 can be used in a conventional manner for routine data processing tasks.

It can be seen that the use of the invention permits an unsecured printer to be used to print postage indicia. Furthermore, this functionality is accomplished without requiring any hardware changes to be made to the data processing system 62 in that access to the secure postage accounting registers is achieved through the system's disk drive 64. That is, no specialized vault or card interface circuitry is required.

In accordance with a further application of the invention there is provided a means for providing copyright protection of application software. Typically, activation keys are used to copyright protect software wherein the user is assigned a secret number which, when entered, allows the application to execute. In accordance with the invention the user-provided activation key is passed to the data processing unit 22 from the host system and is managed thereby in accordance with a predetermined algorithm. The memory of the data processing system 22 includes information relating to valid activation codes. In response to the receipt of a valid activation code the data processing system 22 transmits an authorization signal to the host system permitting use of the software, the software being recorded upon the diskette 12. For example, the activation key may be valid for only a certain period of time or for only a certain number of "software plays" a particularly useful feature if the application software is rented by the user. The data processing system 22 in these cases maintains a record of the number of times that the disk 10 is accessed. Several such activation keys may be supported by the system 22, allowing access to different parts of the application software or to different application programs.

The invention also provides for ensuring or certifying that data on a floppy disk has not been altered. The data processing system 22 may, for example, store the equivalent of a check sum or CRC bits for data stored on the disk 10. This information is stored in the NVRAM 38 only by a user having a proper access permission. The disk 10 may thereafter be checked to determine if the recorded data had been altered by comparing a calculated check sum or CRC with that stored in the NVRAM 38.

A further embodiment of the invention provides a secure mechanism of allowing access to a resource through a data processor. By example, for a machine or process that is controlled by software executed by a computer the use of the invention allows an operator to gain access to the machine or process in accordance with some predetermined criteria. For example, the data processing system 22 is preprogrammed with a predetermined identification or key to allow an operator to operate the machine some x number of times.

Also, the data processing system 22 can be programmed to allow an operator to operate the machine only between a given range of dates or within some predetermined interval of time, such as between 8:00 AM and 5:00 PM. For this embodiment data processing system 22 preferably has a calendar/clock or similar circuitry for maintaining the time and date. The resource usage program or programs may be stored on the host system or may be stored on the diskette 12. Preferably the activation key is securely stored within the memory of the system 22.

Although the invention has been described in the context of several embodiments it should be understood that a number of modifications could be made to these embodiments without departing from the teaching of the invention. For example, the recording medium could have any convenient diameter. Similarly, any suitable track format and bit organization can be employed. Also, the data processing system 22 could include more or less circuitry than that described. By example, the data processing system 22 could include an arithmetic accelerator device such as a floating point arithmetic unit. Thus, while the invention has been particularly shown and described with respect to a number of embodiments and applications thereof, it will be understood by those skilled in the art that changes in form and details may be made therein without departing from the scope and spirit of the invention.

TABLE 3-continued

| Format | Sector Size | N | SC | GPL | GPL |
|---|---|---|---|---|---|
| | 1024 | 03 | 04 | 80 | F0 |
| | 2048 | 04 | 02 | C8 | FF |
| | 4096 | 05 | 01 | C8 | FF |
| 3½" Microfloppy | | | | | |
| FM Mode | 128 bytes/sector | 0 | 0F | 07 | 1B |
| | 256 | 1 | 09 | 0E | 2A |
| | 512 | 2 | 05 | 1B | 3A |
| MFM Mode | 256 | 1 | 0F | 0E | 36 |
| | 512 | 2 | 09 | 1B | 54 |
| | 1024 | 3 | 05 | 35 | 74 |

What is claimed is:

1. Data processing apparatus for communicating with a host system, the host system including a disk drive having a drive read/write head for communication bidirectionally with a removable, rotating, disk-shaped recording medium, the medium being contained within an enclosure; the data processing apparatus comprising:
   a module, the module having physical dimensions substantially similar to the physical dimensions of the enclosure, whereby the module is inserted in the disk drive;
   a disk-shaped recording medium rotated by the disk drive and contained within the module;
   data processing means, including a data processor having memory means for secure storage of data, for communicating said data to the host, the data processing means being at least partially comprised in the module;
   detecting and generating means for detecting signals produced by the drive read/write head and producing signals read by the drive read/write head, the detecting and generating means being connected to the data processing means and being at least partially comprised in the module;
   a read/write head being coupled to the detecting and generating means and being disposed upon or within the recording medium for direct access by said drive read/write head, such that said host communicates with said recording medium via the drive read/write head by directly reading from and writing to inner tracks of the module and communicates with said data processing means via the drive read/write head by directly reading from and writing to said read/write head at outer tracks of said module; and

TABLE 1

| GAP 4a | SYNC | IAM | GAP 1 | SYNC | IDAM | C Y L | H D | S E C | N O | C R C | GAP 2 | SYNC | DATA AM | DATA | C R C | GAP 3 | GAP 4b |
|---|---|---|---|---|---|---|---|---|---|---|---|---|---|---|---|---|---|
| 40x | 6x | | 26x | 6x | | | | | | | 11x | 6x | | | | | |
| FF | 00 | FC | FF | 00 | FE | | | | | | FF | 00 | FB or F8 | | | | |

Index |———————— Repeat N Times ————————|

TABLE 2

| GAP 4a | SYNC | IAM | | GAP 1 | SYNC | IDAM | | C Y L | H D | S E C | N O | C R C | GAP 2 | SYNC | DATA AM | | DATA | C R C | GAP 3 | GAP 4b |
|---|---|---|---|---|---|---|---|---|---|---|---|---|---|---|---|---|---|---|---|---|
| 80x | 12x | 3x | | 50x | 12x | 3x | | | | | | | 22x | 12x | 3x | FB | | | | |
| FF | 00 | C2 | FC | 4E | 00 | A1 | FE | | | | | | 4E | 00 | A1 | F8 | | | | |

Index |———————— Repeat N Times ————————|

TABLE 3

| Format | Sector Size | N | SC | GPL | GPL |
|---|---|---|---|---|---|
| 8" Standard Floppy | | | | | |
| FM Mode | 128 bytes/sector | 00 | 1A | 07 | 1B |
| | 256 | 01 | 0F | 0E | 2A |
| | 512 | 02 | 08 | 1B | 3A |
| | 1024 | 03 | 04 | 47 | 8A |
| | 2048 | 04 | 02 | C8 | FF |
| | 4096 | 05 | 01 | C8 | FF |
| MFM Mode | 256 | 01 | 1A | 0E | 36 |
| | 512 | 02 | 0F | 1B | 54 |
| | 1024 | 03 | 08 | 35 | 74 |
| | 2048 | 04 | 04 | 99 | FF |
| | 4096 | 05 | 02 | C8 | FF |
| | 8192 | 06 | 01 | C8 | FF |
| 5¼" Minifloppy | | | | | |
| FM Mode | 128 bytes/sector | 00 | 12 | 07 | 09 |
| | 128 | 00 | 10 | 10 | 19 |
| | 256 | 01 | 08 | 18 | 30 |
| | 512 | 02 | 04 | 46 | 87 |
| | 1024 | 03 | 02 | C8 | FF |
| | 2048 | 04 | 01 | C8 | FF |
| MFM Mode | 256 | 01 | 12 | 0A | 0C |
| | 256 | 01 | 10 | 20 | 32 |
| | 512 | 02 | 08 | 2A | 50 | means, connected to said data processing means, for generating a rotational reference signal representative of a rotation of said recording medium.

2. The data processing apparatus as set forth in claim 1, wherein only a portion of the recording medium is rotated by the disk drive and the read/write head is disposed upon or within that portion of the recording medium which is not rotated by the disk drive.

3. The data processing apparatus as set forth in claim 1, further comprising means, responsive to the data processing means, for simulating a rotation of the recording medium such that the disk drive detects a signal indicating that the recording medium is rotating.

4. The data processing apparatus as set forth in claim 1, wherein the memory means includes non-volatile data storage means for storing data expressive of units of monetary value.

5. A value printing system, comprising:
   a) a host system, the host system including a disk drive having a drive read/write head for communicating bidirectionally with a removable, rotating, disk-shaped recording medium, the medium being contained within an enclosure;
   b) printing means, responsive to the host system, for printing indicia indicative of monetary values;
   c) a module, the module having physical dimensions substantially similar to the physical dimensions of the enclosure, whereby the module is inserted in the disk drive; said module further comprising:
     c1) a disk-shaped recording medium rotated by the disk drive and contained within the module;
     c2) data processing means, including a data processor having memory means for secure storage of data expressive of a monetary value associated with the printed indicia, for communicating said data to the host, the data processing means being at least partially comprised in the module;
     c3) detecting and generating means for detecting signals produced by the drive read/write head and producing signals read by the drive read/write head, the detecting and generating means being connected to the data processing means and being at least partially comprised in the module; and
     c4) a read/write head being coupled to the detecting and generating means and being disposed upon or within the recording medium for direct access by said drive read/write head, such that the host communicates with said recording medium via the drive read/write head by directly reading from and writing to inner tracks of the module and communicates with said data processing means via the drive read/write head by directly reading from and writing to said read/write head at outer tracks of said module.

6. The value printing system as set forth in claim 5, wherein the module further comprises means, responsive to the data processing means, for generating a reference signal expressive of a rotational position of the recording medium.

7. The value printing system as set forth in claim 5, wherein the memory means includes non-volatile data storage means for storing data expressive of at least postage accounting register information.

8. The value printing system as set forth in claim 5, wherein said data processing means includes means for encrypting and decrypting information, the information being communicated through the drive, read/write head.

9. A value printing system, comprising:
   a) a host system, the host system including a disk drive having an upper and lower drive read/write head for communicating bidirectionally with a removable, rotating disk-shaped recording medium, the medium being contained within an enclosure;
   b) a module, the module having physical dimensions substantially similar to the physical dimensions of the enclosure, whereby the module is inserted in the disk drive; the module further comprising:
     b1) a disk-shaped recording medium rotated by the disk drive and contained within an upper portion of the medium;
     b2) data processing means, including a data processor having memory means for secure storage of data expressive of usage of a resource of the host system, for communicating said data to the host system, the data processing means being at least partially comprised in a lower portion of the module;
     b3) detecting and generating means for detecting signals produced by the drive read/write head and producing signals read by the drive read/write head, the detecting and generating means being connected to the data processing means and being at least partially comprised in the lower portion of the module; and
     b4) a read/write head being coupled to the detecting and generating means and being disposed upon or within a lower surface of the recording medium for direct access by said lower drive read/write head, such that the host system directly communicates with the recording medium via said upper drive read/write head and directly communicates with said data processing means through said read/write head via said lower drive read/write head;
   c) said data processing means is responsive to signals from the host system requesting use of the resource for returning said expressive data to the host system enabling use of the resource.

* * * * *